UNITED STATES PATENT OFFICE.

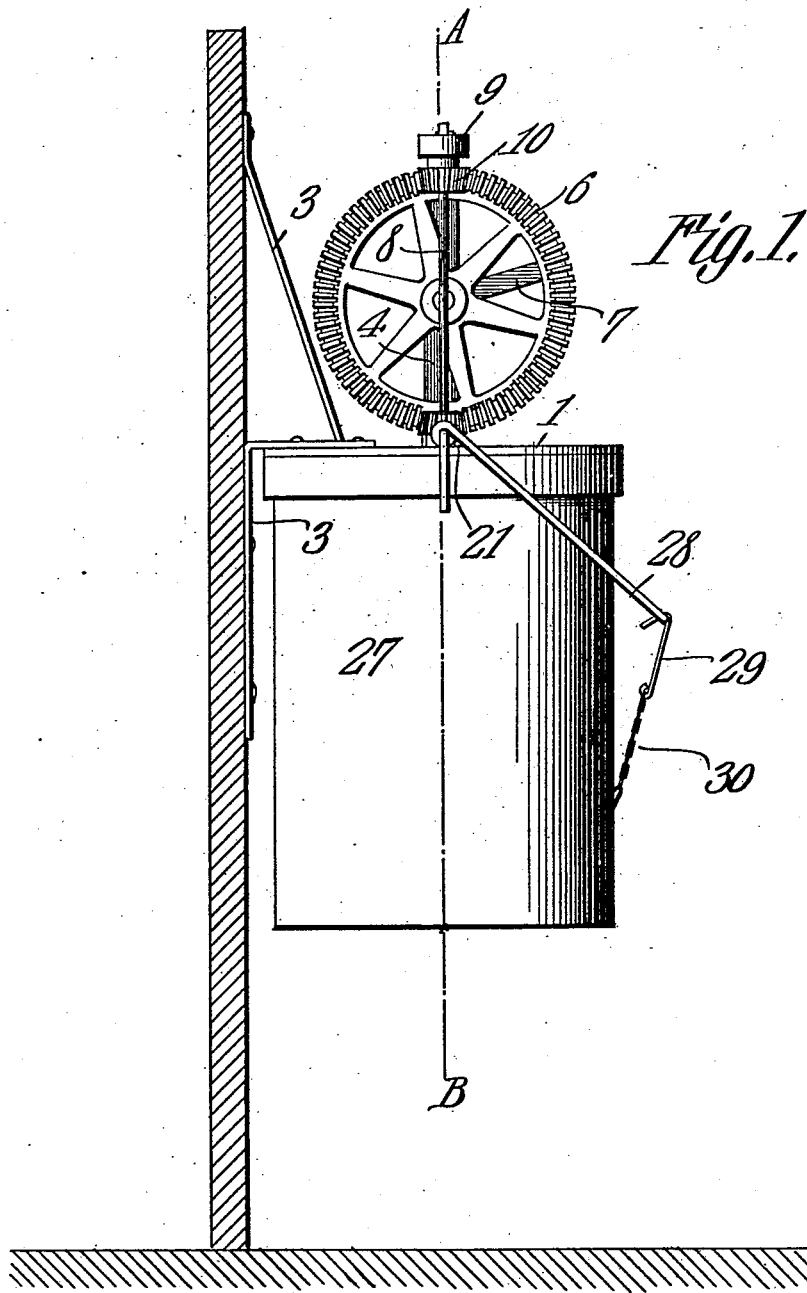

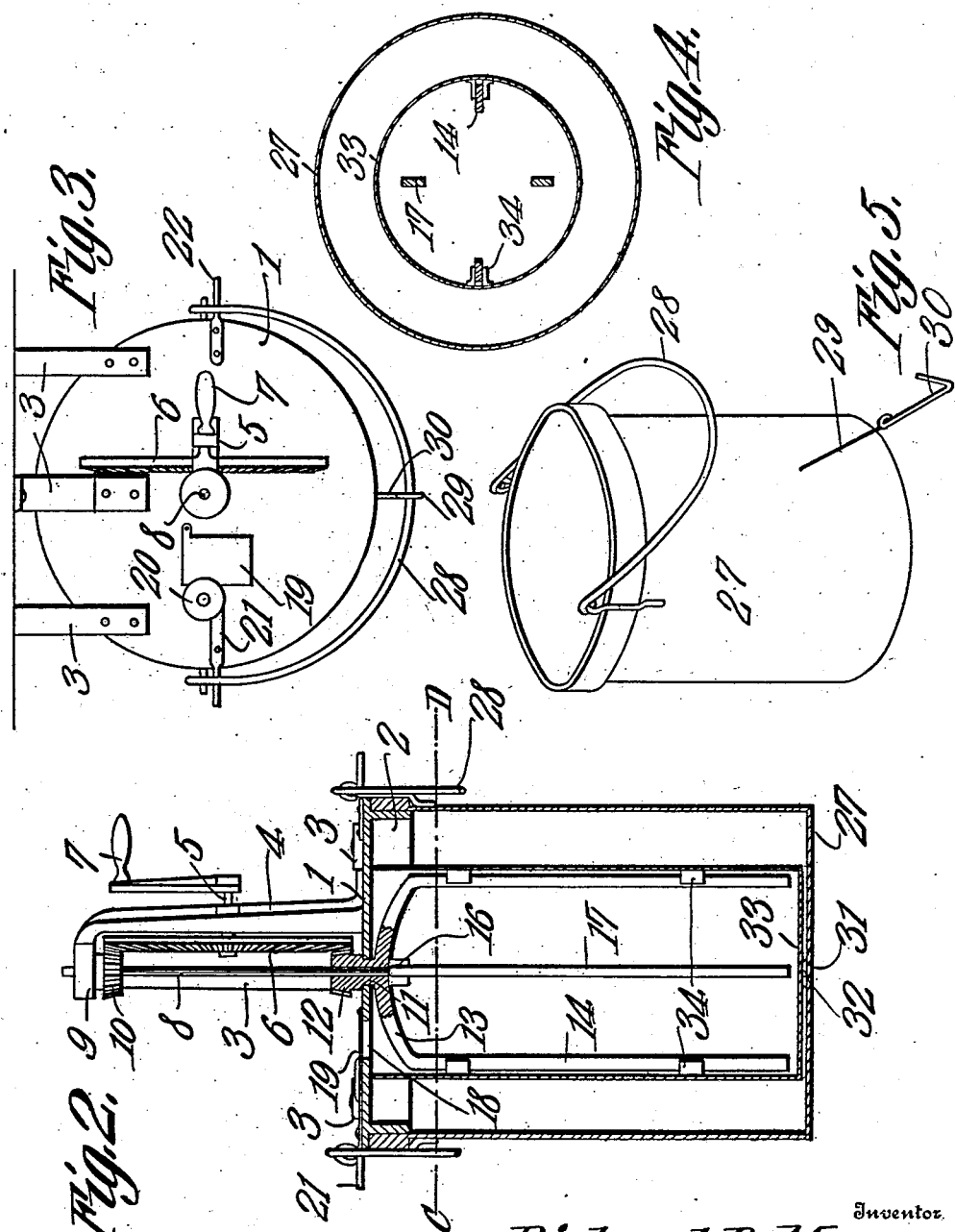

RICHARD DAVIS MOON, OF SAN ANGELO, TEXAS.

ICE-CREAM FREEZER.

No. 924,917.      Specification of Letters Patent.      Patented June 15, 1909.

Application filed May 11, 1908. Serial No. 432,119.

*To all whom it may concern:*

Be it known that I, RICHARD DAVIS MOON, a citizen of the United States, residing at San Angelo, in the county of Tom Green and State of Texas, have invented a new and useful Ice-Cream Freezer, of which the following is a specification.

This invention relates to ice cream freezers, and its object is to provide a device of this character which can be quickly set up for use as an ice cream freezer, said device being also capable of other uses such as an egg beater, churn, etc.

A further object is to provide two series of oppositely rotating blades designed for use under all conditions, one set of blades constituting means for engaging the can of the ice cream freezer so as to cause said can to operate in one direction while the remaining blades rotate in the opposite direction.

A further object is to provide a churn or ice cream receptacle having novel means for attaching it to the main structure, said means being simple, durable and efficient.

With these and other objects in view the invention consists of certain novel features of construction and combination of parts which will be hereinafter more fully described and pointed out in the claims.

In the accompanying drawings is shown the preferred form of the invention.

Figure 1 is a side elevation of the device. Fig. 2 is a section on the line A—B, Fig. 1. Fig. 3 is a plan view of the parts shown in Figs. 1 and 2. Fig. 4 is a section on line C—D, Fig. 2. Fig. 5 is a detail view of the outer receptacle, detached.

Referring to the figures by like characters of reference, 1 designates the circular body of the main structure of the device, said body being provided with a depending circular flange 2. The body is supported upon a wall or other structure by means of brackets 3 extending upwardly and downwardly therefrom, as indicated in Fig. 1, and arranged upon the middle portion of the body is a standard 4 in which is journaled a shaft 5 having a large drive gear 6 at one end and a crank or other power device 7 at its other end. A spindle 8 is mounted at its upper end within an arm 9 extending at right angles to the standard, and this spindle extends downward through the center of the body, there being a gear 10 secured thereon and meshing with the upper portion of the gear 6. A sleeve 11 is mounted to rotate within the body 1 and upon that portion of the spindle extending through the body. This sleeve has a gear 12 at its upper end meshing with the lower portion of gear 6. Oppositely-extending arms 13 extend from the lower portion of the sleeve 11, the two arms terminating in parallel blades 14. Similar arms 16 also extend in opposite directions from the lower end of the spindle 8 and below the arms 13, these arms 16 merging into parallel blades 17 which are spaced apart a shorter distance than the blades 14 so that said blades 17 are free to rotate within the circle described by the blades 14. As shown in Fig. 4, each blade 14 and 17 is preferably formed of a flat strip, the broad faces thereof being disposed in planes extending radially from the axis of rotation.

An opening 18 is formed in the body 1 close to the sleeve 11 and is normally closed by means of a pivoted closure 19 designed, when positioned over the opening, to be held against displacement by a plate 20 which is fastened to the body and constitutes a keeper. This plate also serves as a keeper for one end of a supporting arm 21 which is pivotally mounted upon the body and has one end designed to project beyond the periphery thereof. Another similar arm 22 is connected to the body at a diametrically opposite point and extends beyond the periphery thereof. A bucket such as shown at 27 in Fig. 5 is placed in engagement with the flange 2, said flange projecting into the upper or open end of the bucket. A bail 28 is connected to the bucket and is designed to be extended downward over the arms 21 and 22. This bucket has a cord or chain 29 attached to it and provided with a hook 30 designed to be placed in engagement with the bail so as to hold it firmly pressed upon the arms 21 and 22. In order that the positioning of the bail upon the arms may be facilitated, the arm 21 can be swung inwardly onto the body, and after the bail has been placed back of the arm 22 the arm 21 can be swung in front thereof and the bail then fastened in the manner hereinbefore described.

The bucket 27 has a boss 31 upon the bottom thereof at the center, said boss having a recess to receive a stud 32 extending from the center of the bottom of the can 33. The internal diameter of the can is equal to or a little greater than the circle described by the blades 14. Arranged within this can upon the wall thereof are two diametrically opposed sets of ears 34, each set consisting of superposed pairs, the ears of each pair being spaced apart a sufficient distance to receive one of the blades 14 therebetween.

When it is desired to use the device, the can 33 is placed around the blades 14 and 17 and shifted longitudinally thereon so that the blades 14 will assume positions between the pairs of ears 34. The bucket or receptacle 27 is then placed under and around the can so that the stud 32 will bear within the boss 31 and said bucket is then fastened to the body 1 by means of the bail 28, as heretofore described. It will be seen, therefore, that the body constitutes a closure for both the can and the bucket. The liquid to be frozen can be placed in the can either before or after the parts have been assembled. If it is done after they have been assembled the liquid is poured through the opening 18 after which the opening is closed by means of the plate 19. This opening is also useful for inspecting the contents of the receptacle.

It will of course be understood that when the parts of the ice cream freezer have been assembled in the manner described and the mechanism is rotated the can 33 will be rotated in one direction by the blades 14, while the blades 17 will rotate in the opposite direction in the can.

If desired the device here described can also be used for churning, for beating eggs, etc.

What is claimed is:—

1. The combination with a fixedly supported body, and agitating mechanism carried thereby; of a receptacle for engagement with the body, a bail upon the receptacle, outstanding securing devices on the body for engagement by the bail, and means upon the receptacle for locking the bail in engagement with said devices.

2. The combination with a fixedly supported body, and agitating mechanism carried thereby; of a receptacle for engagement with the body, outstanding engaging devices upon the body, a bail upon the receptacle for overhanging and engaging said devices, means upon the receptacle for locking the bail in engagement with said devices, there being an opening in the body and above the receptacle, and a closure for said opening.

3. The combination with a body having a depending circular flange, and agitating mechanism upon the body; of a receptacle for engagement with the flange, outstanding arms upon the body, one of said arms being pivotally mounted, a bail extending from the receptacle for overhanging the arms, and means carried by the receptacle for engaging the bail to lock it upon the arms.

4. The combination with a body, independent sets of revoluble arms depending therefrom and means for simultaneously rotating said sets in opposite directions and in concentric circles; of a revoluble receptacle movable longitudinally upon and into engagement with one set of blades, said receptacle and the blades engaged thereby being revoluble together and means engaging the body for supporting said revoluble receptacle.

5. The combination with a body, concentric sets of revoluble blades depending therefrom and mechanism upon the body for rotating said sets in opposite directions simultaneously; of a receptacle detachably engaging and supported by the body, a revoluble element supported by said receptacle and surrounding the blades, and means within said element for engaging the blades of one set, said blades and element being revoluble together.

6. The combination with a body, concentric sets of revoluble blades depending therefrom and mechanism upon the body for rotating said sets in opposite directions simultaneously; of a receptacle detachably engaging and supported by the body, a revoluble element supported by said receptacle and surrounding the blades, and spaced ears within said element for receiving the blades of one set therebetween said set and element being revoluble together.

In testimony that I claim the foregoing as my own, I have hereto affixed my signature in the presence of two witnesses.

RICHARD DAVIS MOON.

Witnesses:
J. M. ARMOUR,
L. L. FARR.